United States Patent [19]

Dubois et al.

[11] Patent Number: 4,824,923
[45] Date of Patent: Apr. 25, 1989

[54] SIDE-CHAIN MESOMORPHIC POLYMERS DERIVED FROM 1-(PHENYL)-2-(4-CYANOPHENYL)-ETHANE

[75] Inventors: Jean-Claude Dubois, St Remy les Chevreuse; Pierre Le Barny, Orsay; Nicolas Spassky, Sevres; Sophie Esselin, Antony; Claudine Noel, Houilles; Nicole Lacoudre; Alain Leborgne, both of Paris, all of France

[73] Assignee: Thomson CSF, Paris, France

[21] Appl. No.: 102,440

[22] Filed: Sep. 29, 1987

[30] Foreign Application Priority Data

Sep. 30, 1986 [FR] France .................. 86 13573

[51] Int. Cl.$^4$ ............................. C08F 20/42
[52] U.S. Cl. .................................. 536/298
[58] Field of Search ........................ 526/297

[56] References Cited

U.S. PATENT DOCUMENTS

| | | | |
|---|---|---|---|
| 4,075,165 | 2/1978 | Soma et al. | 524/99 |
| 4,141,883 | 2/1979 | Soma et al. | 524/99 |
| 4,147,655 | 4/1979 | Dubois et al. | 560/73 |
| 4,212,762 | 7/1980 | Dubois et al. | 560/73 |
| 4,222,888 | 9/1980 | Dubois et al. | 560/65 |
| 4,257,910 | 3/1981 | Beguin et al. | 558/416 |
| 4,407,938 | 10/1983 | Mizukura et al. | 430/533 |

FOREIGN PATENT DOCUMENTS 0167912 1/1986 European Pat. Off. .
2722589 11/1978 Fed. Rep. of Germany .
2181943 7/1973 France .
2002767 2/1979 United Kingdom .

Primary Examiner—Joseph L. Schofer
Assistant Examiner—N. Sarofin
Attorney, Agent, or Firm—Oblon, Fisher, Spivak, McClelland & Maier

[57] ABSTRACT

In a family of side-chain homopolymers of the polyacrylate type derived from 1-(phenyl)-2-(4-cyanophenyl)-ethane and exhibiting one or a number of mesophases, the polymer in accordance with the invention corresponds to the following general chemicals formula:

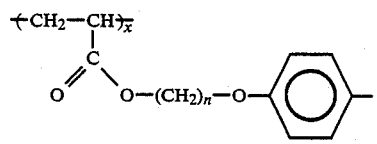

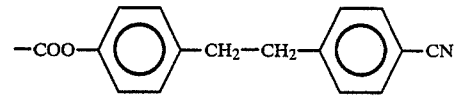

where x indicates the degree of polymerization and $2 \leq n \leq 15$.

1 Claim, No Drawings

SIDE-CHAIN MESOMORPHIC POLYMERS DERIVED FROM 1-(PHENYL)-2-(4-CYANOPHENYL)-ETHANE

BACKGROUND OF THE INVENTION

1. Field of the Invention

This invention relates to a family of side-chain homopolymers of the polyacrylate type derived from 1-(phenyl)-2-(4-cyanophenyl)-ethane and exhibiting one or a number of mesophases.

2. Description of the Prior Art

Increasing consideration is being given at the present time to the possibility of utilizing polymeric materials in devices relating to the field of nonlinear optics or to the display field. The use of these polymers in display devices is subject to two conditions: they must have high dielectric anisotropy and also a nematic mesophase. There also exist, however, experimental display systems in which a smectic-A polymer is employed. Polymers having both these characteristics are in steadily increasing demand. A polymer of this type which possesses in addition a glass transition temperature of higher value than room temperature can advantageously be employed in the field of nonlinear optics.

In order to satisfy these requirements, the invention proposes a family of homopolymers which exhibits high dielectric anisotropy due to the presence of a cyano group which produces at least one nematic mesophase at a high dipole moment and also, in the case of certain members of this family, gives rise to a glass transition temperature which is higher than room temperature.

SUMMARY OF THE INVENTION

The object of the invention is accordingly to provide a side-chain mesomorphic polymer which essentially corresponds to the following general chemical formula:

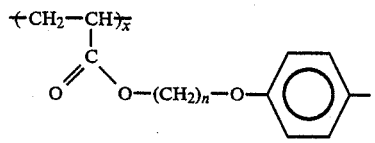

where x indicates the degree of polymerization and $2 \leq n \leq 15$.

The invention also relates to the method of manufacture of polymers of this family.

The polymers obtained are designated by the following names:

poly[1-(4-acryloyloxyethyloybenzoyloxyphenyl)-2-(4'-cyanophenyl)-ethane]
poly[1-(4-acryloyloxypropyloxybenzoyloxyphenyl)-2-(4'-cyanophenyl)-ethane]
poly[1-(4-acryloyloxybutyloxybenzoyloxyphenyl)-2-(4'-cyanophenyl)-ethane]
poly[1-(4-acryloyloxypentyloxybenzoyloxyphenyl)-2-(4'-cyanophenyl)-ethane]
poly[1-4-acryloyloxyhexyloxybenzoyloxyphenyl)-2-(4'-cyanophenyl)-ethane]
poly[1-(4-acryloyloxyheptyloxybenzoyloxyphenyl)-2-(4'-cyanophenyl)-ethane]
poly[1-(4-acryloyloxyoctyloxybenzoyloxyphenyl)-2-(4'-cyanophenyl)-ethane]
poly[1-(4-acryloyloxynonyloxybenzoyloxyphenyl)-2-(4'-cyanophenyl)-ethane]
poly[1-(4-acryloyloxydecyloxybenzoyloxyphenyl)-2-(4'-cyanophenyl)-ethane]
poly[1-(4-acryloyloxyundecyloxybenzoyloxyphenyl)-2-(4'-cyanophenyl)-ethane]
poly[1-(4-acryloyloxydodecyloxybenzoyloxyphenyl)-2-(4'-cyanophenyl)-ethane]
poly[1-(4-acryloyloxytridecyloxybenzoyloxyphenyl)-2-(4'-cyanophenyl)-ethane]
poly[1-(4-acryloyloxytetradecyloxybenzoyloxyphenyl)-2-(4'-cyanophenyl)-ethane]
poly[1-(4-acryloyloxytetradecyloxybenzoyloxyphenyl)-2-(4'-cyanophenyl)-ethane]

DESCRIPTION OF THE PREFERRED EMBODIMENTS

The description which now follows will be concerned with the general process of synthesis of polymers in accordance with the invention as well as their physical characteristics.

General synthesis process

The polymers in accordance with the invention are usually obtained in ten steps from the following commercial products ω-bromoalkanoic acid, 4-hydroxybenzoic acid, acrylic acid, 4-bromophenylacetic acid and anisol.

Reaction 1: Production of 4-bromophenylacetyl chloride. This acid chloride is obtained by action of thionyl chloride on 4-bromophenylacetic acid.

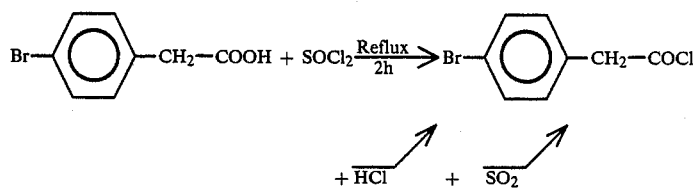

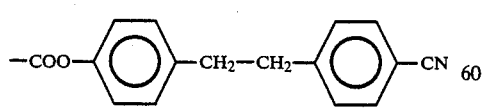

Reaction 2: Synthesis of 4-(4-bromophenylacetyl)-4'-methoxyphenyl. 4-(4-bromophenylacetyl)-4'-methoxyphenyl is obtained by action of 4-bromophenylacetyl chloride on methoxybenzene in the presence of aluminum chloride and methylene chloride at a temperature of 4° C. (Friedel-Crafts reaction).

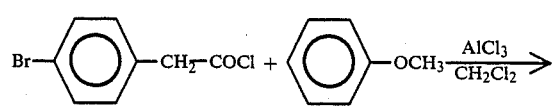

-continued

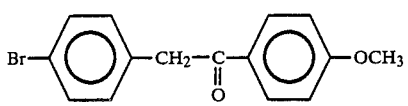

The reaction yield is 75%. The melting point of the product obtained is 139° C.

Reaction 3: Production of 1-(4-bromophenyl)-2-(4'-hydroxyphenyl)-ethane. 4-(4-bromophenylacetyl)-4'-methoxyphenyl is reduced to 1-(4-bromophenyl)-2-(4'-hydroxyphenyl)-ethane in accordance with the Wolf-Kishner reaction modified by Huang-Minlon by action of hydrazine (in an 85 wt % aqueous solution) in a basic medium and in the presence of diethyleneglycol. The basic medium is obtained by means of potassium. This reaction is accompanied by total interruption of the methyl ether function.

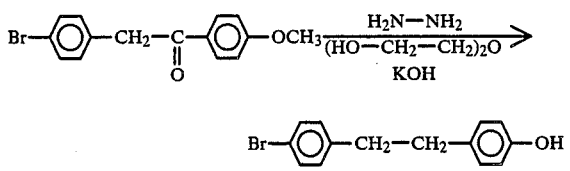

The phenol is separated from the 1-(4-bromophenyl)-2-(4'-methoxyphenyl)-ethane by cold-state dissolution in methanol. The phenol is then recrystallized in benzene.

The reaction yield is 85%. The melting point of the product obtained is 125° C.

Reaction 4: Synthesis of 1-(4-cyanophenyl)-2-(4'-hydroxyphenyl)-ethane.

1-(4-cyanophenyl)-2-(4'-hydroxyphenyl)-ethane is obtained by cyanidation of 1-(4-bromophenyl)-2-(4'-hydroxyphenyl)-ethane by means of cupric cyanide by using N-methylpyrrolidone as solvent.

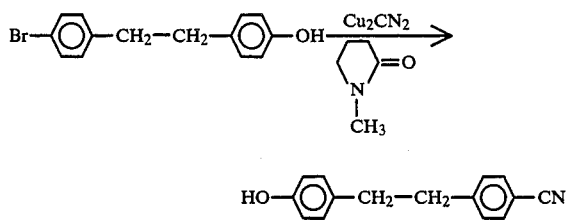

The reaction yield is 84%. The melting point of the product obtained is 152° C.

Reaction 5 : Production of ω-bromoalkanol.

This alcohol is obtained by reduction of the corresponding ω-bromoalkanoic acid by means of lithium hydride and aluminum in ether.

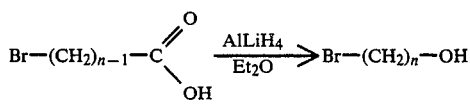

In the case in which n=6, the boiling point of the liquid obtained is 101° C. under a pressure of 4 mm of mercury and the reaction yield is 70%. The alcohols corresponding to n=2, 3 and 11 are available commercially.

Reaction 6: Synthesis of 4(ω-hydroxyalkyloxy)-benzoic acid.

This acid results from the action of ω-bromoalkanol obtained on completion of Reaction 5 on 4-hydroxybenzoic acid in a water-alcohol potassium medium.

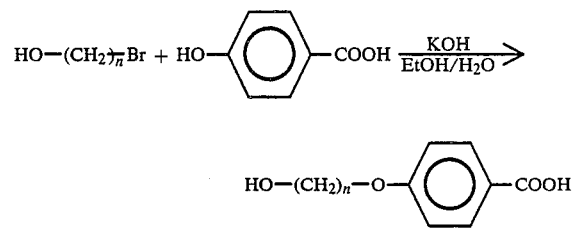

In the case of n=6, the reaction yield is 66.5% and the thermal behavior is as follows:

C 137.2 (N) 114.2 L wherein the temperatures are expressed in degrees Celsius and C designates the crystal phase, (N) designates a monotropic nematic phase and L designates the liquid phase.

Reaction 7: Production of 4-(acryloyloxyalkyloxy)-benzoic acid.

Esterification of the 4-(ω-hydroxyalkyloxy)benzoic acid obtained on completion of Reaction 6 by means of acrylic acid results in 4-(acryloyloxyalkyloxy)benzoic acid. This esterification is carried out by using benzene as solvent and sulfonic paratoluene acid (SPTA) as catalyst. During the reaction, hydroquinone is used as polymerization inhibitor.

$CH_2=CH-COOH +$

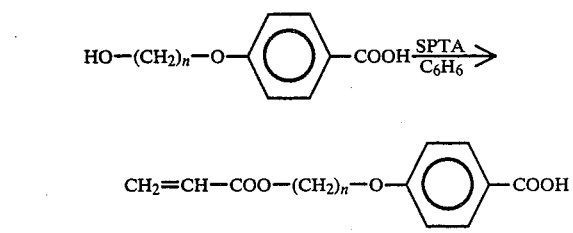

In the case of n=6, the reaction yield is 5% and the phase diagram is as follows:

C 83 $S_c$ 102 N 112 L wherein the temperatures are again expressed in degrees Celsius, and $S_c$ designates a smectic-C phase and N designates a nematic phase.

Reaction 8: Synthesis of 4-(acryloyloxyalkyloxy)-benzoyl chloride.

Transition from the acid obtained on completion of Reaction 7 to the acid chloride is carried out in the cold state by means of oxalyl chloride by using dimethylformamide (DMF) as catalyst.

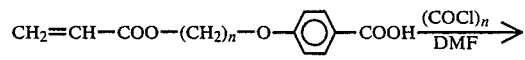

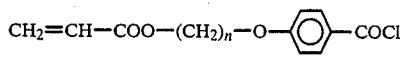

The use of oxalyl chloride instead of thionyl chloride for preparing the desired acid chloride makes it possible to retain the acrylate function.

Reaction 9: Synthesis of 1'-(4-acryloyloxyalkyloxybenzoyloxyphenyl)-2-(4'-cyanophenyl)-ethane.

This ester is synthesized by action of the 4-(acryloyloxyalkyloxy)-benzoyl chloride obtained on completion of Reaction 8 on 1-(4-cyanophenyl)-2-(4'-hydroxyphenyl)-ethane obtained on completion of Reaction 4 in tetrahydrofuran (THF) in the presence of triethylamine.

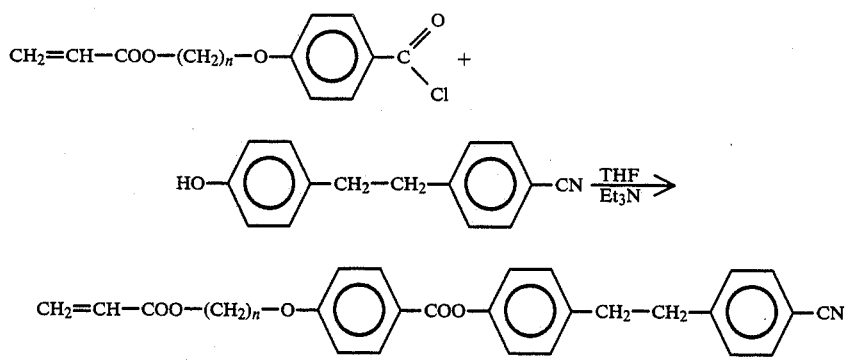

In the case of n=6, the reaction yield is 55%.

Reaction 10: Polymerization of the monomers.

Polymerization may be carried out in vacuo by employing αα'azobisisobutyronitrile as free-radical initiator and by using chlorobenzene as solvent.

By way of example, a few conditions of polymerization are grouped together in Table 1 to be found at the end of this specification. There are indicated in this table, in respect of a few values of n, the ratio M/A (M being the number of moles of the monomer and A being the number of moles of free-radical initiator), the temperature T in degrees Celsius and the time t in hours. Table 1 also mentions the average molecular weights Mp in grams and the index of polydispersity I. The average molecular weights have been determined by GPC (gel permeation chromatography) by adopting polystyrene as a standard. This table also indicates the efficiency of the polymerization operation.

Reactions 7 and 8 are described in German patent No. DE 3,211,400 to Etzbach, Ringsdorf, Portugal and Schmidt. The other chemical reactions are conventional.

A point to be noted is that Reaction 6 is not possible when n=4. In fact, in a basic medium, 4-bromo1-1-butanol is cyclized in accordance with the following reaction:

In order to obtain 4-[-4'-acryloyloxybutyloxy]-benzoic acid (that is to say the final product coresponding to Reaction 7 in the general synthesis process), it is necessary to adopt the reaction diagram given hereunder.

Shielding of the acid function of 4-hydroxybenzoic acid.

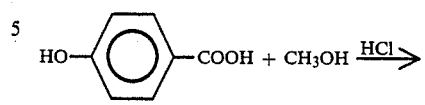

Etherification by means of 1,4-dibromobutane

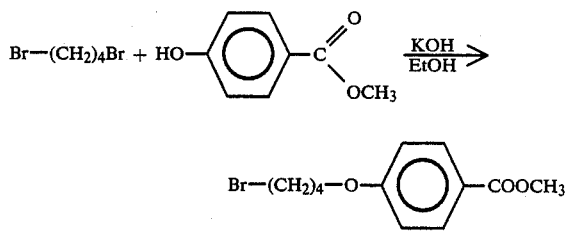

Deshielding of the acid function.

This reaction takes place first in an alcohol potassium medium and then in an acid medium.

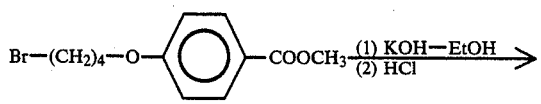

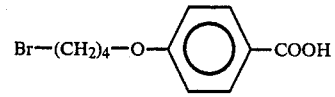

Esterification with lithium acrylate in hexamethylphosphoramide (HMPA).

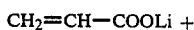

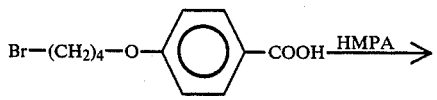

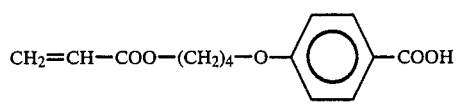

It is therefore apparent that, in the case of n=4, Reactions 5 to 7 of the general synthesis process are replaced by the four reactions given above.

Physical Properties of the Polymers

In order to determine their mesomorphic properties with accuracy, the polymers have been studied by differential enthalpic analysis, optical microscope and X-ray diffraction.

By way of non-limitative example, Table 2 at the end of this specification records the results obtained in respect of different values of n. In this table, the letters G, N, $N_{re}$, S, $S_A$ and L designate respectively the glassy, nematic, reentrant nematic, smectic, smectic-A and liquid phases. The transition temperatures indicated in this table are expressed in degrees Celsius.

The polymers in accordance with the invention thus exhibit a nematic phase (n=2 or 6, for example), have a glass transition temperature which is higher than room temperature, are amorphous and carry a permanent dipole (cyano group) in their side chain, which permits alignment in an electric field). Accordingly, these polymers find a potential application in nonlinear optics and more particularly in the generation of second harmonics. They can in fact serve as an orientation matrix for small molecules having high second-order hyperpolarizability and can lead to non-centrosymmetric systems after orientation in an electric field.

TABLE 1

| n | Conditions of polymerization | | | GPC | | Efficiency (%) |
|---|---|---|---|---|---|---|
| | M/A | T | t | Mp | I | |
| 2 | 37 | 70 | 72 | 10 300 | 1.4 | 43 |
| 6 | 33 | 70 | 72 | 7 900 | 1.4 | 77 |
| 11 | 29 | 70 | 96 | 7 200 | 1.4 | 45 |

TABLE 2

| n | Mesomorphic properties | | | | | | | |
|---|---|---|---|---|---|---|---|---|
| 2 | G | | 75 | | N | | 220 | L |
| 6 | G | 37 | $N_{re}$ | 110 | $S_A$ | 170 | N 190 | L |
| 11 | G | | 42 | | S | | 210 | L |

What is claimed is:

1. A side-chain mesomorphic polymer corresponding to the following general chemical formula:

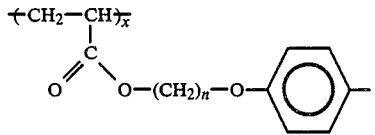

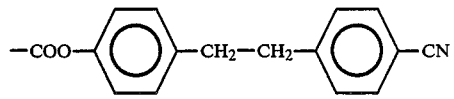

where x indicates the degree of polymerization and $2 \leq n \leq 15$.

* * * * *